N. J. A. WAHLBERG.
INSULATOR.
APPLICATION FILED APR. 9, 1918.

1,404,814.

Patented Jan. 31, 1922.

WITNESSES:
Ed. V. Herron
Fred H. Miller

INVENTOR
Nils J. A. Wahlberg
BY
Wesley G. Carr
ATTORNEY

UNITED STATES PATENT OFFICE.

NILS J. A. WAHLBERG, OF PITTSBURGH, PENNSYLVANIA, ASSIGNOR TO WESTINGHOUSE ELECTRIC & MANUFACTURING COMPANY, A CORPORATION OF PENNSYLVANIA.

INSULATOR.

1,404,814.　　Specification of Letters Patent.　　Patented Jan. 31, 1922.

Application filed April 9, 1918. Serial No. 227,435.

*To all whom it may concern:*

Be it known that I, NILS J. A. WAHLBERG, a citizen of the United States, and a resident of Pittsburgh, in the county of Allegheny and State of Pennsylvania, have invented a new and useful Improvement in Insulators, of which the following is a specification.

My invention relates to insulators and particularly to suspension insulators for trolley conductors.

One object of my invention is to provide a device of the above-indicated character that shall effectively comprise a frangible insulating body portion.

Another object of my invention is to provide an insulator comprising members of metal and porcelain or other similar material that may be secured together without the use of cement.

A further object of my invention is to provide a trolley-wire-suspension insulator, comprising a plurality of readily assembled parts, that shall be protected from the blows of roving trolley wheels or other current-collecting devices and have a relatively large creepage surface and that shall also permit of the ready renewal of worn or injured parts.

Heretofore, suspension insulators for relatively low-voltage service have usually comprised a metal cap or member of inverted cup shape in which a shank for the support of a clamp has been set in a body of molded insulating material. Injury to any portion of an insulator of this type usually requires removal of the entire device.

In high-voltage service, more complicated structures have usually been necessary, many of which have embodied the well known petticoat or bell insulators which have not been adapted for disposition within the range of a roving trolley wheel or shoe. Such devices have frequently been used in conjunction with catenary structures where they have been positioned relatively great distances from the trolley conductors.

In practicing my invention, I provide for the effective use of a frangible or other insulating body member, in trolley-wire-suspension insulators, that may be used in conjunction with high or low-voltage systems and that, while comprising replaceable parts, shall be protected from injury from trolley wheels or other current-collecting devices that may become detached from the conductor.

Figure 1:
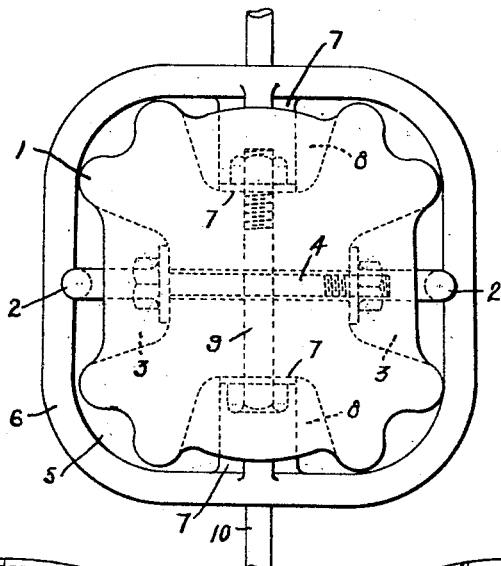
Figures 2, 3:
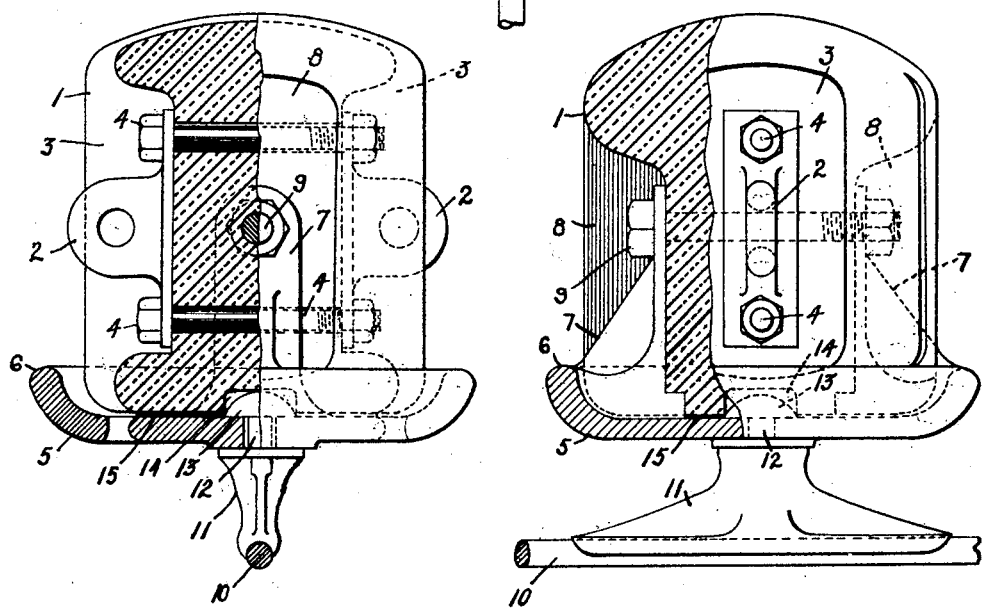

Figure 1 is a plan view of a device embodying my invention; Fig. 2 is a view, partially in section and partially in elevation thereof and Fig. 3 is a view taken at right angles to Fig. 1.

A main insulating body portion 1 comprises substantially a solid block or prism, preferably of porcelain, and is similar to a well known type of suspension insulator in that certain of its faces are curved to constitute relatively long current-leakage-path surfaces.

Supporting members 2, oppositely disposed in vertical grooves or counter-sunk portions 3, are joined by bolts 4 that extend through the block 1 and constitute means whereby the latter may be attached to guy-wires or other suitable supporting means. When guy-wires are used, the same are usually regulated with a considerable degree of tension in order to be maintained in a substantially horizontal position. By reason of the disposition of the members 2 and the bolts 4 relative to the block 1, the tension forces of the guy-wires, or similar forces of other supporting means, will not be transmitted to the block.

A member 5 at the lower end or face of the block 1 constitutes a plate or barrier for the block 1 against the blows of a trolley wheel or other current-collecting device that has been separated from the wire. This plate may have up-turned edges 6 and be provided with a yielding pad or washer 15, such as lead or felt, in order that it may constitute a readily adaptable seat for, and further protect the lower end of, the block. Upwardly projecting arms 7 on the plate 5 extend into oppositely disposed grooves 8 in the block 1, and the upper ends of the arms 7 are joined by a bolt 9 that extends through the block at a position intermediate, and angularly disposed at substantially $90°$ from, the bolts 4. Thus, the member 5 is effectively insulated from the members 2 and a structure of readily replaceable members is provided in which substantially the only mechanical stresses tending to fracture the insulating body are those caused by its own weight and the weight of the trolley conductor.

A conductor 10, attached to a clamping member 11, may suitably be supported on the plate 5 by a bolt 12 that extends through the plate and has a head 13 disposed in a recess 14 in the lower end of the block 1.

While I have shown and described a particular form of my invention, many changes may be effected therein without departing from the spirit and scope thereof, as set forth in the appended claims.

I claim as my invention:

1. A suspension insulator for trolley conductors comprising a block of insulating material, supporting means disposed adjacent to opposite faces thereof, connecting means for said supporting means extending through said block, a protective shield, and means disposed adjacent to other opposite faces of said block for securing said shield thereto.

2. A suspension insulator for trolley conductors comprising a block of insulating material, supporting members disposed on opposite faces thereof, a connecting member for said supporting members extending through said block, a member having arms for embracing other opposite faces of said block and a member extending through the block for securing said arms thereto.

3. A suspension insulator for trolley conductors comprising an insulating member having vertical sides, a supporting member disposed on a vertical side thereof, a protective member for the insulating member, means attached to a vertical side of said insulating member for supporting said protective member and means for supporting a conductor on said protective member.

4. A suspension insulator for trolley conductors comprising a block of insulating material, supporting members disposed on opposite faces thereof, a connecting member for said supporting members extending through said block, a protective shield having arms for embracing other opposite faces of said block and means for securing said arms to said block.

5. A suspension insulator for trolley conductors comprising a block of insulating material having a plurality of grooves in perpendicular longitudinal faces thereof, supporting members disposed in the grooves of opposite faces thereof, a protective shield for the lower end of said block and supporting means for said shield disposed in the grooves of other opposite faces thereof and angularly displaced with respect to said supporting members.

6. A suspension insulator for trolley conductors comprising substantially a prism of insulating material having a plurality of pairs of grooved faces, supporting members disposed in opposite grooves, a pair of spaced connecting bolts for said supporting members and extending through said prism, a protective shield for one base of said prism, arms on said shield angularly displaced with respect to said supporting members and also disposed in opposite grooves and a connecting bolt for said arms extending through said prism between the connecting bolts for said supporting members.

7. A suspension insulator for trolley conductors comprising a block of insulating material, supporting members disposed on vertical sides thereof and a protective plate for the lower end thereof having upwardly projecting arms that engage sides of said block displaced from the sides on which said supporting members are disposed, means for attaching said arms to said block and means for supporting a conductor on said plate.

In testimony whereof, I have hereunto subscribed my name this 28th day of March, 1918.

NILS J. A. WAHLBERG.